(No Model.) 2 Sheets—Sheet 2.
L. J. & A. L. BARTHELEMY.
FILTER.
No. 563,639. Patented July 7, 1896.
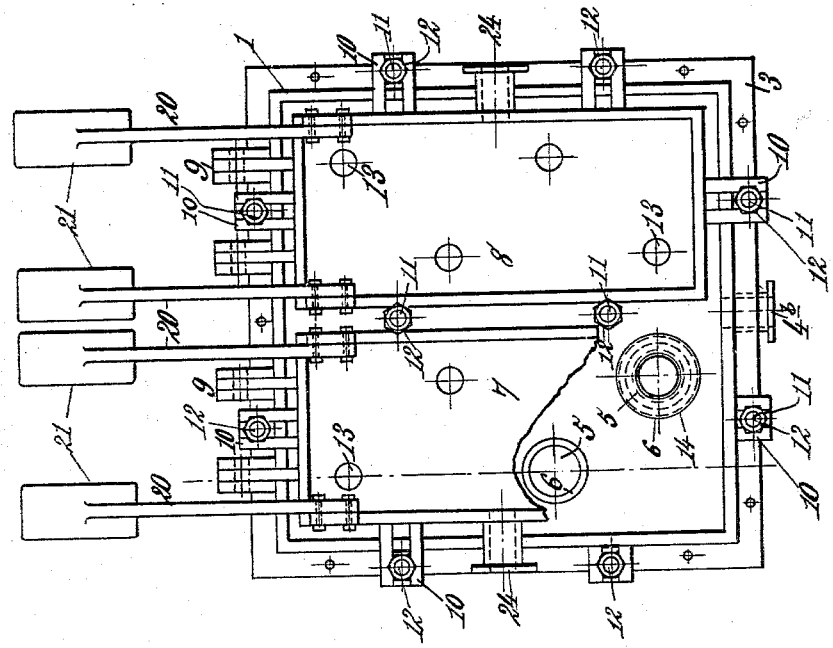
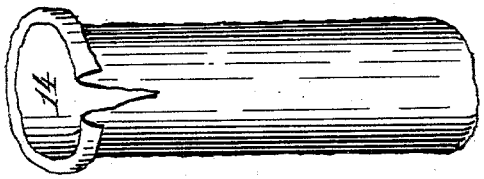
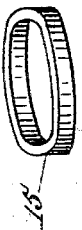
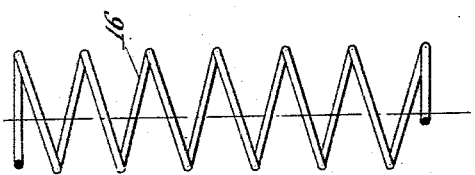
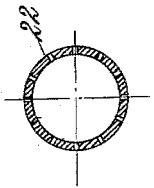
WITNESSES:
INVENTORS.
Louis J. Barthelemy
Aristide L. Barthelemy
BY
ATTORNEY

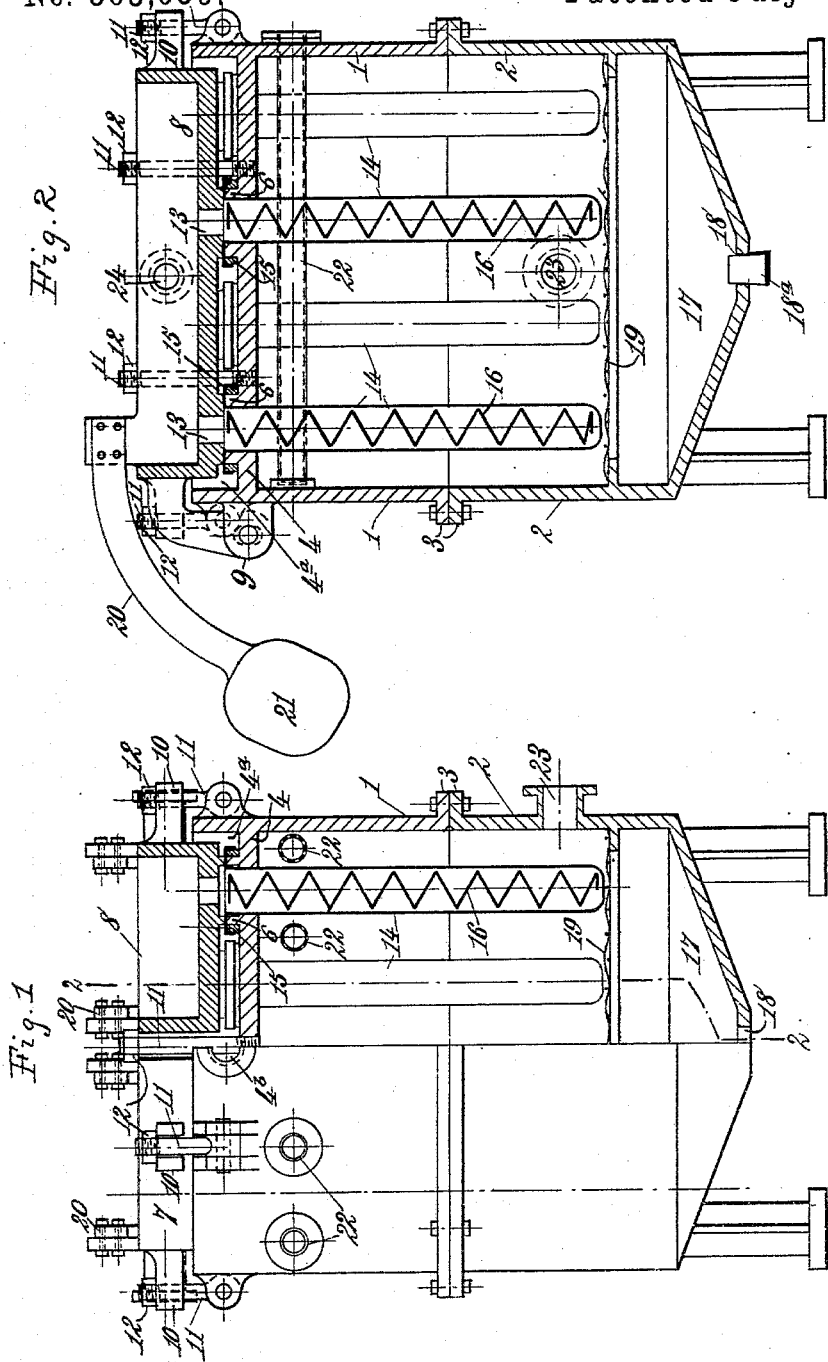

UNITED STATES PATENT OFFICE.

LOUIS J. BARTHELEMY AND ARISTIDE L. BARTHELEMY, OF NEW ORLEANS, LOUISIANA.

FILTER.

SPECIFICATION forming part of Letters Patent No. 563,639, dated July 7, 1896.

Application filed May 23, 1895. Serial No. 550,417. (No model.)

*To all whom it may concern:*

Be it known that we, LOUIS J. BARTHELEMY and ARISTIDE L. BARTHELEMY, citizens of the United States, residing at New Orleans, in the parish of Orleans and State of Louisiana, have invented certain new and useful Improvements in Filters; and we do hereby declare that the following is a full, clear, and exact description of the same, reference being had to the annexed drawings, making a part of this specification, and to the figures of reference marked thereon.

This invention relates to filters, and is more especially designed for the filtration of saccharine juices and syrups; and it has for its object to increase the capacity and efficiency of the class of filters described, and also to provide improved means for cleaning the filter-cloths without opening the filter.

To these ends our invention consists in the novel features and in the construction or arrangement of parts hereinafter described, and pointed out in the claims following the description, due reference being had to the accompanying drawings, forming a part of this specification, in which—

Figure 1 is an elevation, partly in section, of our improved filter. Fig. 2 is a vertical section taken on the line 2 2 of Fig. 1. Fig. 3 is a top plan view. Fig. 4 is a detail perspective view of one of the filter-bags. Fig. 5 is a similar view of one of the coiled springs for distending the filter-bags. Fig. 6 is a cross-section of one of the flushing-pipes. Fig. 7 is a perspective view of one of the rubber gaskets employed for effecting a tight joint between the open ends of the filter-bags and the top of the filter.

In order that those skilled in the art may be able to make and use our invention, we will describe the same in detail, reference being had to the accompanying drawings, in which like numerals of reference indicate corresponding parts.

Referring to said drawings, the numerals 1 and 2 respectively indicate the upper and lower portions of the casing of our improved filter, which at their adjacent edges are provided with flanges 3, by means of which and suitable fastening-bolts the said sections are fastened together. In the upper end of the section 1, and preferably cast or formed integrally therewith, is a diaphragm 4, forming a pan 4ª, the bottom of which is provided with a plurality of perforations 5, about each of which is cast a boss 6. Arranged within the upper end of said section 1, and above the diaphragm 4, are two or more trays 7 and 8, which are hinged at one side, as at 9, to the section 1, and are provided with laterally-projecting bifurcated lugs 10, through which are adapted to pass bolts 11, pivotally connected to the upper outer sides of the section 1, nuts 12 being tapped over the upper ends of said bolts, by means of which the trays are firmly fastened down in place upon the diaphragm 4. The said trays 4 are provided with perforations 13, so arranged that they will correspond or register with the perforations 5, formed in the diaphragm 4, and are preferably of a somewhat smaller diameter than said last-named perforations. Adapted to be secured within each of said perforations 5 are filter-bags 14, formed of any suitable or desired textile material, the upper ends of said bags being turned over the bosses 6 and over rubber gaskets 15, arranged about said bosses, whereby when the trays 7 and 8 are bolted down in place a perfectly close joint is formed between said filter-bags and trays. Within each of the filter-bags 14 is disposed a coiled spring 16, by means of which the filter-bags are held distended. The section 2 is provided with a hopper-shaped bottom 17, having a discharge-outlet 18, adapted to be closed by a suitable plug, as 18ª, and arranged above said bottom 17 is a grating 19, shown in the present instance as consisting of a wire-netting, which serves to support the weight of the filter-bags and prevent them from being torn. Should one of said filter-bags, however, become torn, or through some cause permit impure juices to escape, a rubber plug may be inserted in the perforation 13 in the tray that communicates with said filter-bag, thus cutting out the imperfect bag from operation.

Each of the trays 7 and 8 is somewhat smaller than one-half the cross-sectional area of the section 1, whereby a space is formed between the edges of said trays and the sides of the section 1, for the purpose hereinafter made apparent. In order to facilitate raising and lowering said trays upon their hinges, arms 20 are connected to the hinged sides of the trays, which, at their free ends, carry counterweights 21.

When it becomes necessary to wash the filter-bags and the interior of the filter-casing, it can be accomplished without opening the filter by the following means: Arranged within the casing 1 immediately below the diaphragm 4 are perforated pipes 22, each of said pipes being closed at one end and at its other end is connected with a steam and water supply pipe. When steam and water under pressure is admitted to said pipes 22, it is sprayed through the perforations in the pipes in all directions, thoroughly washing off the filter-bags and the interior of the filter, the water and impurities being carried off through the discharge-opening 18 in the hopper-shaped bottom 17, the plug 18$^a$ having been first removed.

From the foregoing description the operation of our improved filter will be readily understood.

The juices to be filtered enter the filter through an inlet 23, formed in the lower end of the casing 2, and pass through the material forming the filter-bags into the interior thereof, thus freeing the juices of all impurities. The filtered juices then pass up in the filter-bags into the trays 7 and 8, from whence they are discharged by suitable outlets 24. Should any of the joints between the filter-bags and the diaphragm and trays prove defective, permitting impure juices to leak therethrough, the said juices will escape into the pan 4$^a$, from whence they will be conveyed into a slop-tank (not shown) by a pipe 4$^b$.

We have described the filter as being made in two sections 1 and 2, and as having two trays 7 and 8, but it will be evident that the number of said sections and trays may be varied, the number employed being dependent upon the size of the filter. It will also be evident that the filter may be employed for the filtration of liquids of all kinds.

Having described our invention, what we claim is—

1. In a filter, the combination with a closed casing having an inlet and provided with a perforated top, of a series of filter-bags having open upper ends secured within the perforations in said top, and a tray resting upon the said top and provided with apertures communicating with the open ends of said filter-bags, substantially as described.

2. In a filter, the combination with a closed casing having an inlet and provided with a perforated trough-shaped top, of a series of filter-bags having open, upper ends secured within the perforations in said top, a tray seated within said trough-shaped top and provided with perforations registering with the perforations in the said top, and an outlet for the trough-shaped top, substantially as described.

3. In a filter, the combination with a closed casing having an inlet and provided with a perforated trough-shaped top, of filter-bags having upper open ends secured in the perforations in said top, a tray seated in said trough-shaped top and having openings registering with the openings in the top, and outlets for the said tray and trough-shaped top, substantially as described.

In testimony whereof we have hereunto subscribed our names in the presence of two witnesses.

LOUIS J. BARTHELEMY.
ARISTIDE L. BARTHELEMY.

Witnesses:
W. H. COOK,
R. E. L. C. RIES.